United States Patent
Lee et al.

(10) Patent No.: US 7,433,423 B2
(45) Date of Patent: Oct. 7, 2008

(54) MULTIPLE TRELLIS CODED DIFFERENTIAL UNITARY SPACE-TIME MODULATION

(75) Inventors: Jae Hong Lee, Seoul (KR); Soonsang Soh, Jeonju-si (KR)

(73) Assignee: Seoul National University Industry Foundation, Seoul (KR)

( * ) Notice: Subject to any disclaimer, the term of this patent is extended or adjusted under 35 U.S.C. 154(b) by 821 days.

(21) Appl. No.: 10/926,710

(22) Filed: Aug. 26, 2004

(65) Prior Publication Data
US 2005/0147182 A1     Jul. 7, 2005

(30) Foreign Application Priority Data
Jan. 7, 2004     (KR) ............... 10-2004-0000990

(51) Int. Cl.
  *H04L 27/00* (2006.01)
(52) U.S. Cl. .................................................. 375/299
(58) Field of Classification Search ........... 375/267, 375/299, 347, 297; 455/91, 101, 132–137
See application file for complete search history.

(56) References Cited

U.S. PATENT DOCUMENTS 5,416,801 A * 5/1995 Chouly et al. ............... 375/260
2002/0122502 A1 * 9/2002 El-Gamal et al. ........... 375/267

OTHER PUBLICATIONS

Mohammad et al., "Generalized Block Space-Time Trellis Codes: Set Partitioning and Code Design," IEEE, 2005, pp. 461-465.*
Soonsang, "Multiple Trellis Coded Differential Unitary Space-Time Modulation," IEEE, 2003, pp. 1002-1006.*
B. L. Hughes, "Differential space-time modulation" IEEE Trans. Inform. Theory, vol. 46, No. 7, pp. 2567-2578, Nov. 2000.
B.M. Hochwald et al. "Unitary space-time modulation for multiple-antenna communications in Rayleigh fading", IEEE Trans. Inform. THeory, vol. 46 No. 2 pp. 543-564, Mar. 2000.
X. Liang et al, "Unitary signal constellations for differential space-time modulation with two transmit space-time modulation with two transmit antennas: parametric codes, optimal design, and bounds", IEEE Trans. Inform. Theory, vol. 48, No. 8 pp. 2291-2322, Aug. 2002.
I. Bahececi et al., "Combined turbo coding and unitary space-time modulation," IEEE Trans. Commun., vol. 50, No. 8, pp. 1244-1249, Aug. 2002.
M. Tao et al., "Trellis-coded differential unitary space-time modulation in slow flat fading channels with interleaver," in Proc. IEEE WCNC 2002, Orlando, FL, Mar. 17-21, 2002, pp. 285-290.
D. Divsalar et al., "The design of trelllis coded MPSK for fading channgels: set partitioning for optimum code design," IEEE Trans. Commun., vol. 36, No. 9, pp. 1013-1021, Sep. 1988.
S. Siwamogsatham et al., "Improved High-Rate Space-Time Codes Via Orthogonality and Set Partitioning," in Proc. IEEE WCNC 2002, Orlando, Fl., Mar. 17-21, 2002, pp. 264-270.
B. L. Hughes, "Optimal space-time constellations from groups," IEEE Trans. Inform. Theory, vol. 49,No. 2, pp. 401-410, Feb. 2003.

* cited by examiner

*Primary Examiner*—Tesfaldet Bocure
(74) *Attorney, Agent, or Firm*—Keusey, Tutunjian & Bitetto, P.C.

(57) ABSTRACT

A method of differential unitary space-time modulation is provided by encoding messages to transmit through multiple transmitting antenna into multiple trellis code in a communication system wherein the signals are transmitted between multiple transmitting antennas and at least one receive antenna. The performance provided is superior to that of the modulation of the prior art.

3 Claims, 5 Drawing Sheets

MULTIPLE TRELLIS CODED DIFFERENTIAL UNITARY SPACE-TIME MODULATION

BACKGROUND OF THE INVENTION

1. Field of the Invention

The present invention relates to a method of differential unitary space-time modulation by encoding messages to transmit through multiple transmit antenna into multiple trellis code in a communication system wherein the signals are transmitted between multiple transmit antennas and at least one receive antenna.

2. Prior Art

Differential unitary space-time modulation (DUSTM) is a scheme proposed for the transmit antenna diversity to combat detrimental effects in wireless fading channels at a receiver without channel state information. In the DUSTM, the transmitted signal matrix at each time block is the product of the previously transmitted signal matrix and the current unitary data matrix. The constellations for unitary space-time modulated signals form groups under matrix multiplication.

Since the proposal of the DUSTM, several works to improve performance of the DUSTM have been introduced.

However, the performance of DUSTM in a communication system wherein the signals are transmitted and received between multiple transmit antennas and at least one receive antenna is not satisfactory.

SUMMARY OF THE INVENTION

One object of the invention is to provide a method of DUSTM by encoding messages to transmit through multiple transmitting antenna into multiple trellis code in a communication system wherein the signals are transmitted between multiple transmit antennas and receive antenna.

DETAILED DESCRIPTION OF THE PREFERRED IMPLEMENTATION

Reference will now be made in detail to the modulation method according to preferred embodiments of the present invention as illustrated in the accompanying drawings.

First, the channel model will be explained. It is assumed that the channel is a wireless channel in which data are sent from $n_T$ transmit antennas to $n_R$ receive antennas. $n_T$ is an integer no less than 2, and $n_R$ is an integer no less than 1.

Further, it is assumed that this channel has flat Rayleigh fading, and the channel coefficients for different transmit-receive antenna pairs are statistically independent and remain unchanged during T time interval of symbolic period. Let $c_t^j$ denote the transmitted signal from the transmit antenna j at the time t where $j=1, 2, \ldots, n_T$, and $t=1, 2, \ldots, T$. The received signal $y_t^i$ for the received antenna i at the time t is given by Formula 1:

$$y_t^i = \sqrt{\rho} \sum_{j=1}^{n_T} h_{ji} c_t^j + n_t^i, \; i = 1, 2, \ldots, n_R \quad \text{[Formula 1]}$$

wherein, $\rho$ represents the signal-to-noise ratio (SNR) per receive antenna, $h_{ji}$ represents the zero-mean complex Gaussian channel coefficient from the transmit antenna j to the receive antenna i with variance 0.5 per dimension, and $n_t^i$ is the zero-mean complex additive white Gaussian noise (AWGN) at the receive antenna i with variance 0.5 per dimension.

It is assumed that the power of transmitted signal is normalized to unit power.

The received signal in matrix form, i.e., received signal matrix, is written as Formula 2:

$$Y = \sqrt{\rho} CH + N \quad \text{[Formula 2]}$$

wherein, $Y = \{Y_t^i\}$ is the $T \times n_R$ received signal matrix, $C = \{C_t^j\}$ is the $T \times n_T$ transmitted signal matrix, $H = \{h_{ji}\}$ is the $n_T \times n_T$ channel matrix with independent and identically distributed (i.i.d.) entries, and $N = \{n_t^i\}$ is the $T \times n_R$ noise matrix with i.i.d. entires.

For an unknown channel matrix H, the conditional probability density function (pdf) of the received signal matrix Y given a transmitted signal matrix C is given by Formula 3:

$$p(Y \mid C) = \frac{\exp(-tr\{Y^\dagger (I + \rho CC^\dagger)^{-1} Y\})}{\pi^{n_R T} \det(I + \rho CC^\dagger)^{n_R}} \quad \text{[Formula 3]}$$

wherein, tr represents trace, and

† represents conjugate transpose.

Now, the differential unitary space-time modulation (DUSTM) will be explained.

Let $V_k$ denote the $n_T \times n_T$ data matrix at the kth block wherein only the DUSTM with $T = n_T$ is considered. The data matrix $V_k$ forms a unitary space-time constellation V with $$V \equiv \{V(l) \mid V(l) = V(1)^l, l = 0, 1, 2, \ldots, L-1\} \text{ wherein,}$$

$$V(1) = \text{diag}\left(e^{j\frac{2\pi u_1}{L}}, e^{j\frac{2\pi u_2}{L}}, \ldots, e^{j\frac{2\pi u_{n_T}}{L}}\right), \text{ and}$$

L is the cardinality of V.

For the convenience of explanation, the unitary space-time constellation V is simply expressed as follows:

$$(L; [u_1, u_2, \ldots, u_{n_T}])$$

Let $C_k$ denote the $n_T \times n_T$ transmitted signal matrix at the kth block. This matrix $C_k$, and the received signal matrix $(Y_k)$ for $C_k$ are given by Formulas 4 and 5, respectively:

$$C_k = V_k C_{k-1}, \; C_0 = I \quad \text{[Formula 4]}$$

$$Y_k = \sqrt{\rho} C_k H + N_k \quad \text{[Formula 5]}$$

wherein, $N_k$ is the noise matrix at the kth block, and

H is the channel matrix which is constant during two consecutive blocks.

Similarly to differential phase shift keying (DPSK), the DUSTM receiver estimates data matrix $V_k$ by observing two consecutive received signal matrices $$\overline{Y}_k \triangleq [Y_{k-1}^T \vdots Y_k^T]^T,$$

wherein T represents transpose. Two transmitted signal matrices that affect $\overline{Y}_k$ are $$\overline{C}_k = [C_{k-1}^T \vdots C_k^T]^T.$$

From the Formula 3, the conditional pdf of $\overline{Y}_k$ is given by Formula 6:

$$p(\overline{Y}_k | \overline{C}_k) = \frac{\exp\left(-tr\left\{\overline{Y}_k^\dagger \left(I - \frac{\rho}{1+2\rho}\begin{bmatrix}I\\ \vdots \\ V_k\end{bmatrix}[I \vdots V_k^\dagger]\right)\overline{Y}_k\right\}\right)}{\pi^{2n_T n_R}(1+2\rho)^{n_T n_R}} \quad \text{[Formula 6]}$$

$$= p(\overline{Y}_k | V_k)$$

The data matrix may be estimated by maximizing the conditional pdf of the Formula 6 as following Formula 7:

$$\hat{V}_k = \arg\max_{V \in \mathcal{V}} tr\left\{\overline{Y}_k^\dagger \begin{bmatrix}I\\ \vdots \\ V\end{bmatrix}[I \vdots V^\dagger]\overline{Y}_k\right\} \quad \text{[Formula 7]}$$

$$= \arg\max_{V \in \mathcal{V}} Re\, tr\{Y_{k-1} Y_k^\dagger V\}$$

Hereinafter, the method of differential unitary space-time modulation by encoding messages to transmit through multiple transmit antenna into multiple trellis code (MTC).

Figure 1:
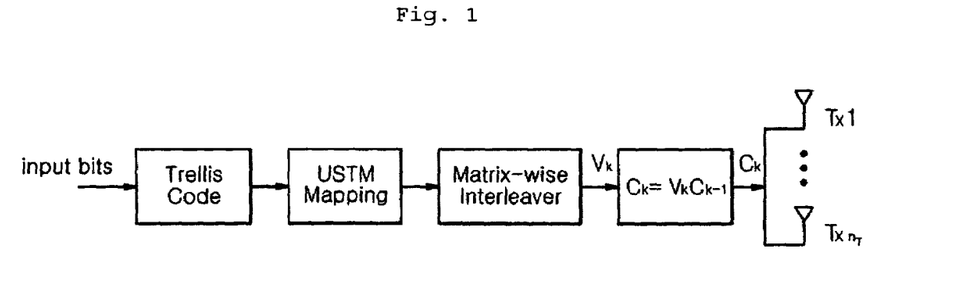
FIG. 1 illustrates a transmitter used in the DUSTM according to the present invention.

FIG. 1 illustrates an exemplary transmitter used in the MTC DUSTM according to the present invention. Information bits are encoded by a rate mb/mn multiple trellis code. The encoded bit stream is divided into the blocks of n bits each of which is mapped into an element in the unitary space-time constellation V. After matrix-wise interleaving, the unitary space-time mapped signals are differentially encoded and transmitted by transmit antennas over a slow flat Rayleigh fading channel.

Let Y and V denote the received signal matrix sequence $\{Y_0, Y_1, \ldots\}$, and the coded signal matrix sequence $\{V_0, V_1, \ldots\}$, respectively. The pair-wise error probability (PEP), i.e., the probability of incorrectly decoding V to U, is given by Formula 8:

$$p(V \to U) \le \prod_k \det\left(I + \frac{\rho^2}{4(1+2\rho)}(V_k - U_k)^\dagger(V_k - U_k)\right)^{-n_R} \quad \text{[Formula 8]}$$

Let $\eta(V,U)$ denote the set of k such that $V_k \ne U_k$. Then inequality of the Formula 8 becomes Formula 9:

$$p(V \to U) \le \left(\frac{\rho}{8}\right)^{-n_T n_R \delta} \prod_{k \in \eta} |\det(V_k - U_k)|^{-2n_R} \quad \text{[Formula 9]}$$

wherein, $\delta$ is the size of $\eta(V,U)$, i.e., the block Hamming distance between V and U.

To minimize the PEP of the Formula 9, it is needed to maximize the minimum block Hamming distance $$\left(\delta_{\min} \equiv \min_U |\eta(V,U)|\right),$$

and the minimum product of squared determinant distance $((IID^2)_{min})$. the minimum product of squared determinant, $(IID^2)_{min}$ is defined as following Formula 10:

$$\left(\prod D^2\right)_{\min} \equiv \min_U\left(\prod_{k \in \eta(V,U)} D^2(V_k, U_k)\right) \quad \text{[Formula 10]}$$

$$= \min_U\left(\prod_{k \in \eta(V,U)} |\det(V_k - U_k)|^{\frac{2}{n_T}}\right)$$

Let $A_0$ denote the complete constellation, i.e., signal points $0, 1, 2, \ldots, L-1$, and $A_0 \otimes A_0$ denote a two-fold ordered Cartesian product of $A_0$ with itself wherein the ordered Cartesian product means the concatenation of corresponding elements in the two sets forming the product.

The partitioning is as follows:

The first step is to partition $A_0 \otimes A_0$ into L signal sets $A_0 \otimes B_i$ ($i=0, 1, \ldots, L-1$), wherein the jth element (j=0, 1, \ldots, L-1) of $B_i$ is nj⊕i, and ⊕ is modulo L.

The jth 2-tuple signal points from $A_0 \otimes B_i$ are the ordered pair (j, nj⊕i).

Then, n is chosen to maximize the minimum product of squared distance $(IID^2)_{min}$ with $\delta_{min} = m$ within the partitioned set. Let n* denote optimum n satisfying this condition. Then, the n* for $\delta_{min} = 2$ is given as following Formula 11. The n* is 1,3 for L=8, and 3,5 for L=16 from the Formula 11:

$$n^* = \arg\max_n \prod D^2 \quad \text{[Formula 11]}$$

$$= \arg\max_{n=1,3,\ldots,L/2-1}\left\{\min_{m=1,2,\ldots,L/2-1} 16\sin\left(\frac{mu_1\pi}{L}\right)\right.$$

$$\left.\sin\left(\frac{nmu_1\pi}{L}\right)\sin\left(\frac{mu_2\pi}{L}\right)\sin\left(\frac{nmu_2\pi}{L}\right)\right\}$$

The second step is an odd-even split of the first level partitioning. The third and succeeding steps are identical to the second step, odd-even split.

Figure 2:
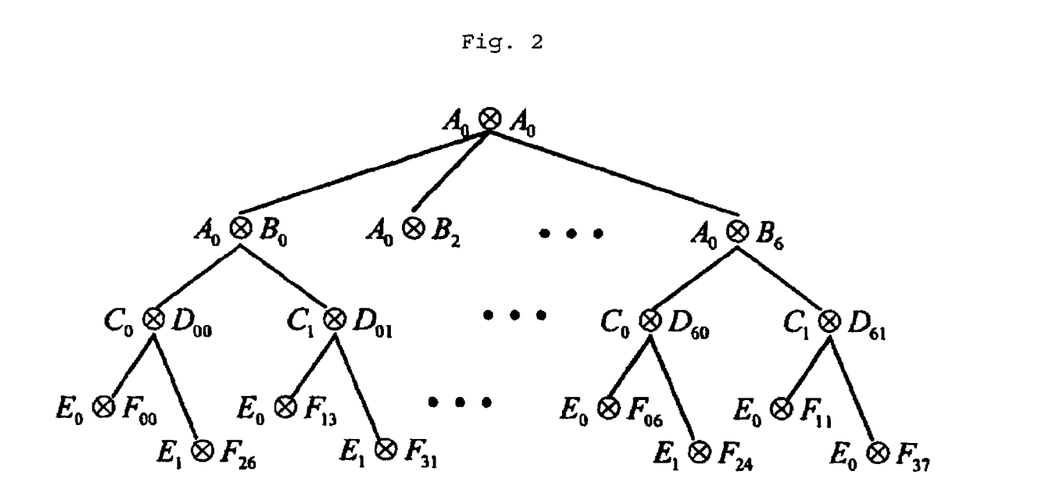
FIG. 2 illustrates a set partitioning for (8; [1,3]) in the DUSTM according to the present invention.

FIG. 2 illustrates the set partitioning for (8; [1,3]) for multiple (m=2) trellis code with n*=3. At the first level of the set partitioning, the sets partitioned from the set $A_0 \otimes A_0$ are given as follow:

$$A_0 \otimes B_0 = \begin{bmatrix} 0 & 0 \\ 1 & 3 \\ 2 & 6 \\ 3 & 1 \\ 4 & 4 \\ 5 & 7 \\ 6 & 2 \\ 7 & 5 \end{bmatrix}, A_0 \otimes B_2 = \begin{bmatrix} 0 & 2 \\ 1 & 5 \\ 2 & 0 \\ 3 & 3 \\ 4 & 6 \\ 5 & 1 \\ 6 & 4 \\ 7 & 7 \end{bmatrix},$$

$$A_0 \otimes B_4 = \begin{bmatrix} 0 & 4 \\ 1 & 7 \\ 2 & 2 \\ 3 & 5 \\ 4 & 0 \\ 5 & 3 \\ 6 & 6 \\ 7 & 1 \end{bmatrix}, A_0 \otimes B_6 = \begin{bmatrix} 0 & 6 \\ 1 & 1 \\ 2 & 4 \\ 3 & 7 \\ 4 & 2 \\ 5 & 5 \\ 6 & 0 \\ 7 & 3 \end{bmatrix},$$

Since the sets $A_0 \otimes B_i$ (i=0, 2, 4, 6) have the largest $\Pi D^2$ in $A_0 \otimes A_0$, sets $A_0 \otimes B_i$ (i=1, 3, 5, 7) are excluded from the set partitioning. If higher data rate is required, sets $A_0 \otimes B_i$ (i=1, 3, 5, 7) may be included in the set partitioning with sacrificing good distance property. The sets of the second level are odd-even split of the first level partitioning, and given as follows:

$$C_0 \otimes D_{00} = \begin{bmatrix} 00 \\ 26 \\ 44 \\ 62 \end{bmatrix}, C_1 \otimes D_{01} = \begin{bmatrix} 13 \\ 31 \\ 57 \\ 75 \end{bmatrix}, C_0 \otimes D_{20} = \begin{bmatrix} 02 \\ 20 \\ 46 \\ 64 \end{bmatrix}, C_1 \otimes D_{21} = \begin{bmatrix} 15 \\ 33 \\ 51 \\ 77 \end{bmatrix},$$

$$C_0 \otimes D_{40} = \begin{bmatrix} 04 \\ 22 \\ 40 \\ 66 \end{bmatrix}, C_1 \otimes D_{41} = \begin{bmatrix} 17 \\ 35 \\ 53 \\ 71 \end{bmatrix}, C_0 \otimes D_{60} = \begin{bmatrix} 06 \\ 24 \\ 42 \\ 60 \end{bmatrix}, C_1 \otimes D_{61} = \begin{bmatrix} 11 \\ 37 \\ 55 \\ 73 \end{bmatrix},$$

Similarly, from the sets of the second level, the sets of the third level are given as follows:

$$E_0 \otimes F_{00} = \begin{bmatrix} 00 \\ 44 \end{bmatrix}, E_1 \otimes F_{26} = \begin{bmatrix} 26 \\ 62 \end{bmatrix}, E_0 \otimes F_{13} = \begin{bmatrix} 13 \\ 57 \end{bmatrix}, E_1 \otimes F_{31} = \begin{bmatrix} 31 \\ 75 \end{bmatrix},$$

$$E_0 \otimes F_{02} = \begin{bmatrix} 02 \\ 46 \end{bmatrix}, E_1 \otimes F_{20} = \begin{bmatrix} 20 \\ 64 \end{bmatrix}, E_0 \otimes F_{15} = \begin{bmatrix} 15 \\ 51 \end{bmatrix}, E_1 \otimes F_{33} = \begin{bmatrix} 33 \\ 77 \end{bmatrix},$$

$$E_0 \otimes F_{04} = \begin{bmatrix} 04 \\ 40 \end{bmatrix}, E_1 \otimes F_{22} = \begin{bmatrix} 22 \\ 66 \end{bmatrix}, E_0 \otimes F_{17} = \begin{bmatrix} 17 \\ 53 \end{bmatrix}, E_1 \otimes F_{15} = \begin{bmatrix} 35 \\ 71 \end{bmatrix},$$

$$E_0 \otimes F_{06} = \begin{bmatrix} 06 \\ 42 \end{bmatrix}, E_1 \otimes F_{24} = \begin{bmatrix} 24 \\ 60 \end{bmatrix}, E_0 \otimes F_{11} = \begin{bmatrix} 11 \\ 55 \end{bmatrix}, E_1 \otimes F_{37} = \begin{bmatrix} 37 \\ 73 \end{bmatrix},$$

Based on the set partitioning described above, the multiple trellis codes are constructed as follows.

All elements in the constellation should be equally probable. The 2 branches departing from or converging to a state are assigned with elements from one of $\{A_0 \otimes B_0, A_0 \otimes B_4\}$ and $\{A_0 \otimes B_2, A_0 \otimes B_6\}$. The branches departing from or converging to adjacent states are assigned with elements from the other.

While minimum product of squared determinant distance $\Pi D^2$ in the sets of the first level is equal to each other, $\delta_{min}$ having the $\Pi D^2$ in $\{A_0 \otimes B_0, A_0 \otimes B_4\}$ and $\{A_0 \otimes B_2, A_0 \otimes B_6\}$ is larger then that in $\{A_0 \otimes B_0, A_0 \otimes B_2\}$ and $\{A_0 \otimes B_4, A_0 \otimes B_6\}$.

Since the error path between the parallel branches becomes the shortest error event path whose Hamming distance is $\delta_{min}$, parallel branches are assigned with elements from the set having the largest product of squared determinant distance at the lowest level of set partitioning. Hence the multiplicity of multiple trellis code guarantees the same $\delta_{min}$ as that of trellis code without parallel branches.

Figure 3A:
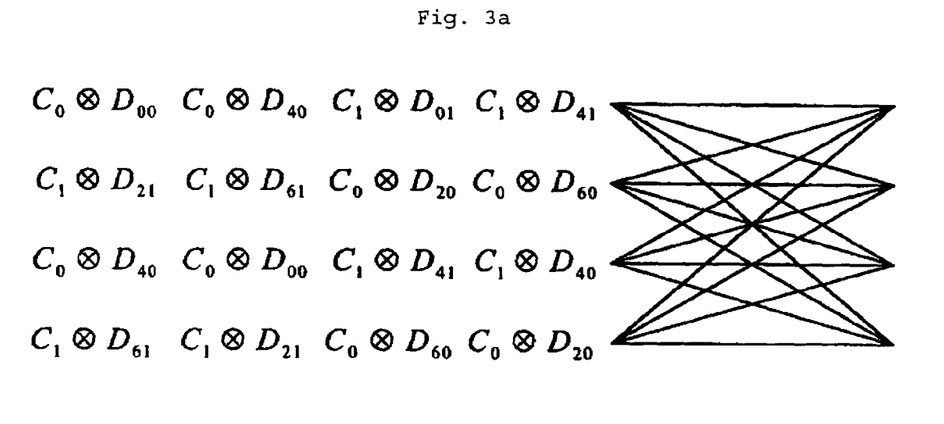
FIGS. 3a and 3b illustrate the multiple trellis code wherein the rate is 4/6, and the number of states are 4 and 8, respectively.
Figure 3B:
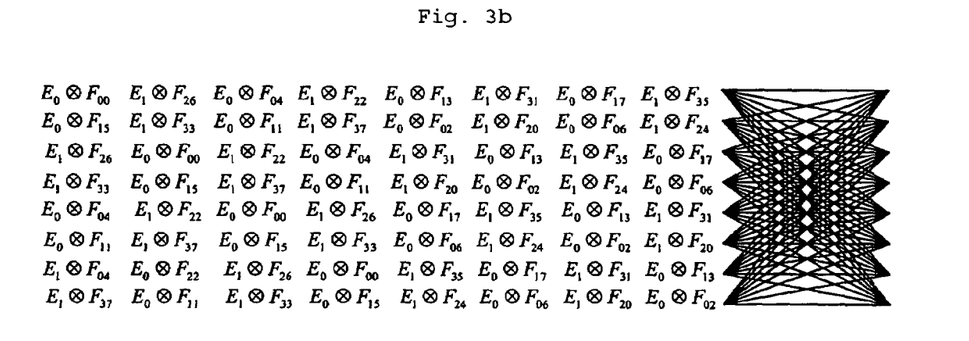

FIGS. 3a and 3b illustrate the multiple trellis code for (8; [1,3]). They show the rate 4/6 4-state, and 8-state multiple trellis code for (8; [1,3]), respectively. The values of $\Pi D^2$ for the multiple trellis coded DUSTM for 4-state and 8-state are 4 and 16, respectively. The value of $\delta_{min}$ is 2.

Rate 6/8 multiple trellis codes for (16; [1,7]) are constructed by the same method by which multiple trellis for (8; [1,3]) are constructed.

Figure 4A:
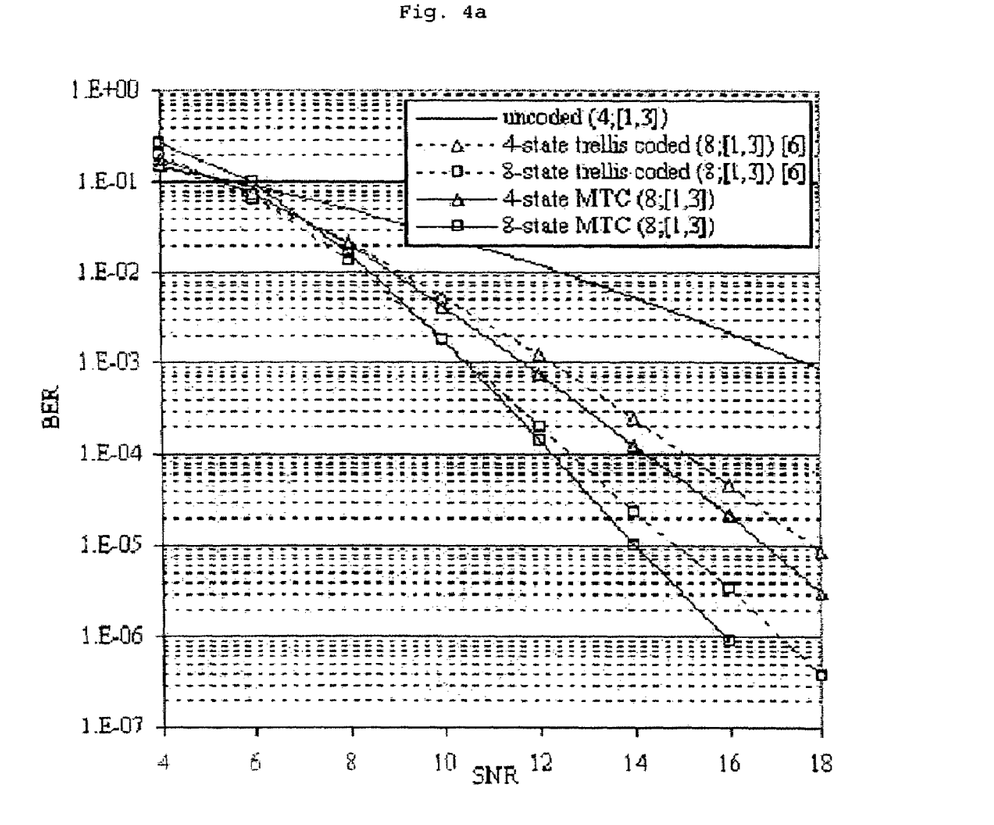
FIGS. 4a and 4b illustrate bit error rate (BER) in the multiple trellis coded (MTC) DUSTM, uncoded DUSTM, and trellis coded DUSTM, wherein R is 1 bit/s/Hz and 1.5 bits/s/Hz, respectively.
Figure 4B:
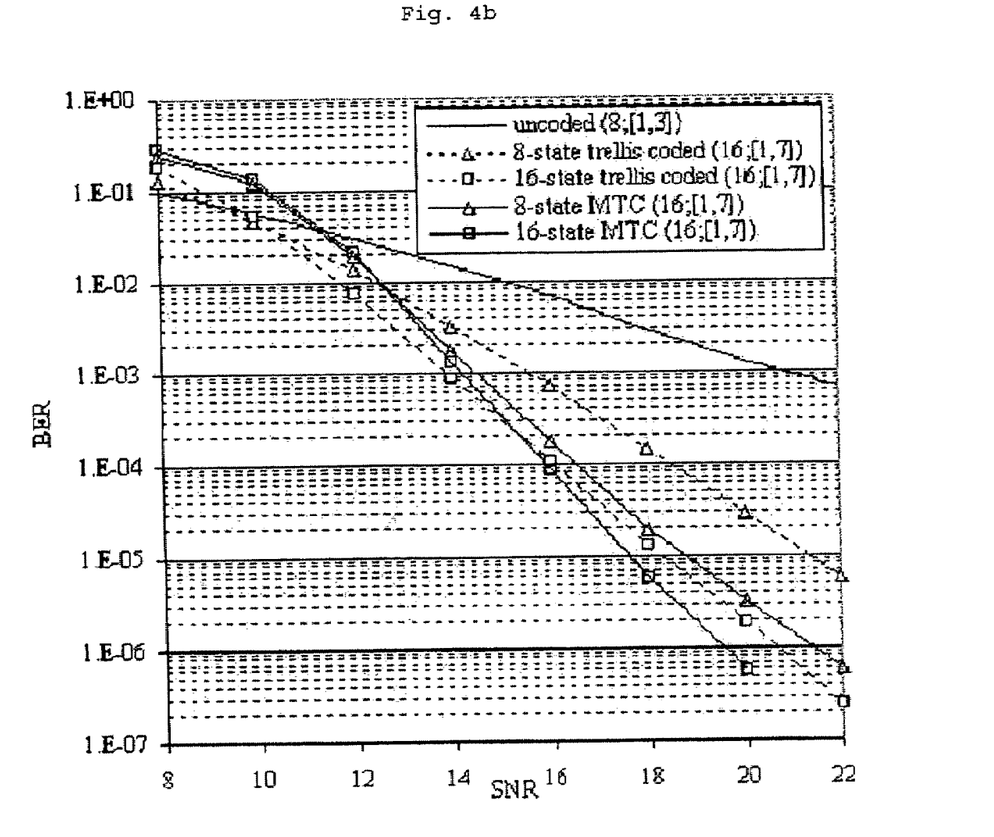

FIGS. 4a and 4b illustrate bit error rate (BER) of multiple trellis coded (MTC) DUSTM compared to that of the uncoded DUSTM and trellis coded DUSTM for 2 transmit antenna and 1 receive antenna.

FIG. 4a shows the BER of the MTC DUSTM for spectral efficiency R=1 bit/s/Hz. In FIG. 4a, it is shown that the 4-state and 8-state MTC DUSTM give 0.9 dB and 1.0 dB gain over the 4-state and the 8-state trellis coded DUSTM at a BER of $10^{-5}$, respectively.

FIG. 4b shows the BER of the MTC DUSTM for spectral efficiency R=1.5 bits/s/Hz. In FIG. 4b, it is shown that the 8-state and 16-state MTC DUSTM give 2.5 dB and 0.7 dB gain over the 8-state and 16-state trellis coded DUSTM at a BER of $10^{-5}$, respectively.

Hereinafter, the computational complexity will be explained.

Since the number of branches per a transition in the trellis increases exponentially as spectral efficiency increases in a multiple trellis code, it has much higher computational complexity than a trellis code.

The computational complexity may be decreased by reducing the number of branches as follows.

First, the branch metrics for all elements in the unitary space-time constellation V at each block is computed and stored. Then, most-likely candidates within each set assigned to the parallel branches are found, and maximum likelihood decision among only the most-likely candidates is performed. The sets assigned to the parallel branches are the ordered Cartesian product of V. Once the branch metrics for the elements of each set are computed and stored, the branch metrics for repeated elements need not to be calculated again. Viterbi algorithm is performed with such selected branches.

The computational complexity is evaluated in terms of the number of operations such as addition, multiplication, and comparison. Let Mb denote the number of operations needed to compute a branch metric. For example, $M_b$=10 for (8; [1,3]), i.e., 8 multiplications and 2 additions are performed. Let $M_t$ denote the number of operations needed to decode a symbol. Then, the number of operations in the MTC DUSTM is given by following Formula (12):

$$M_t = \frac{2^{b+1} \times m \times M_b + 2 \times (2^{mb+1} + 2^b \times S)}{m \times n_T} \quad \text{[Formula 12]}$$

wherein S is the number of states.

The number of operations in the trellis coded DUSTM is given by Formula 13:

$$M_t = \frac{2^{b+1} \times M_b + 2 \times 2^b \times S}{n_T} \quad \text{[Formula 13]}$$

Table 1 shows the number of operations in the MTC DUSTM compared to that in the trellis coded DUSTM. It is shown that the number of operations in the former is comparable to that in the latter.

TABLE 1

Number of operations in the MTC DUSTM

| R bits/s/Hz | Type of coded DUSTM | $M_t$ |
|---|---|---|
| 1 | 4-state MTC(8; [1, 3]) | 64 |
| | 8-state MTC (8; [1, 3]) | 72 |
| | 4-state trellis coded (8; [1, 3]) | 56 |
| | 8-state trellis coded (8; [1, 3]) | 72 |
| 1.5 | 8-state MTC (16; [1, 7]) | 176 |
| | 16-state MTC (16; [1, 7]) | 208 |
| | 8-state trellis coded (16; [1, 7]) | 114 |
| | 16-state trellis coded (16; [1, 7]) | 208 |

Figure 5:
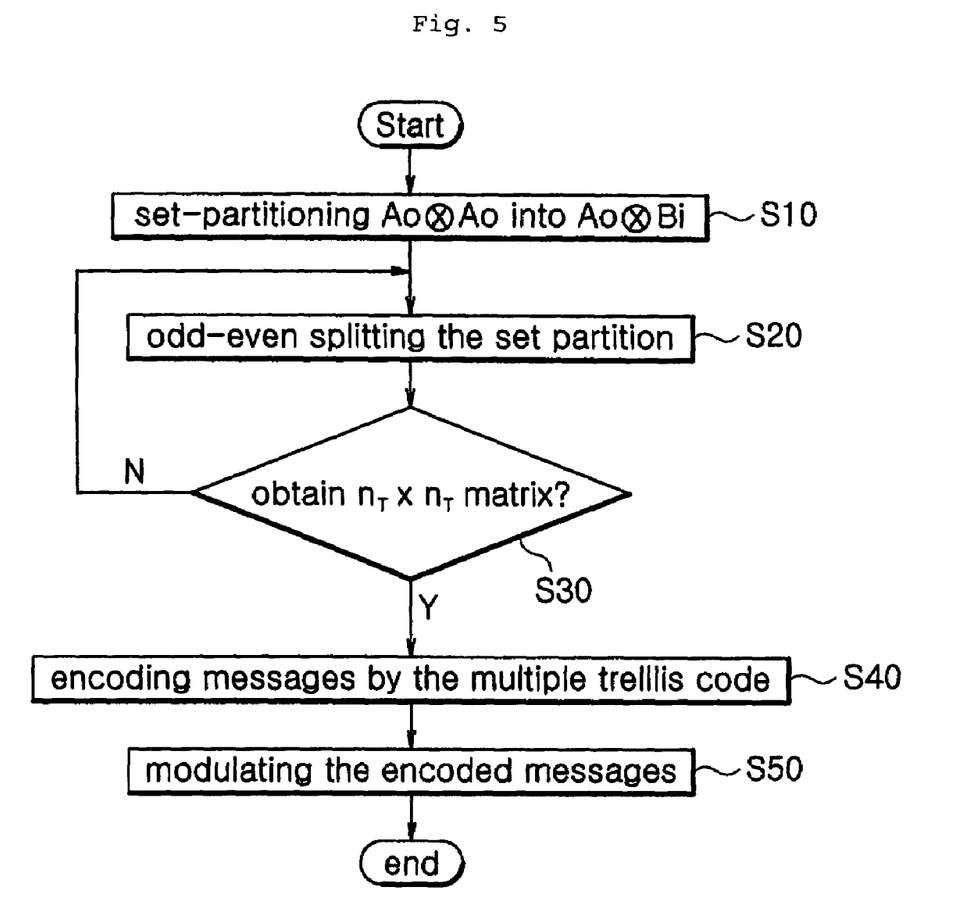
FIG. 5 is a flow chart illustrating the method of DUSTM according to the present invention.

FIG. 5 is a flow chart illustrating the method of DUSTM by encoding messages to transmit through $n_T$ transmit antennas in a communication system wherein the signals are transmitted between $n_T$ transmit antennas and $n_R$ receive antennas wherein $n_T$ is an integer no less than 2, and $n_R$ is an integer no less than 1.

The first step (S10) is to set-partition two-fold ordered Cartesian product of $A_0$, $A_0 \otimes A_0$ into L signal sets $A_0 \otimes B_i$ (i=0, 1, ..., L−1) The jth element (j=0, 1, ..., L−1) of $B_i$ is nj$\delta$i, $\oplus$ is modulo L, $A_0$ is the complete constellation (signal point 0, 1, 2, ..., L−1), the jth 2-tuple signal points is (j,nj$\oplus$i) of the $A_0 \otimes B_i$, and n is selected from n* which maximize the minimum product of squared distance $(IID^2)_{min}$ with $\delta_{min}$=m within the partitioned set using the Formula (11).

The second step (S20) is odd-even splitting the set partition. The odd-even split is repeated to obtain a multiple trellis code in a $n_T \times n_T$ matrix (S30).

Then, messages are encoded by the multiple trellis code (S40), and the encoded messages are modulated by a unitary space-time modulation method according to Formula 2 (S50). The relation among the transmitted signal C from the jth transmit antenna (j=1, 2, ..., $n_T$) at time t (t=1, 2, ..., T), the received signal Y at the ith receive antenna for the transmitted signal C, channel matrix H, and noise matrix N is given by the Formula 2.

The foregoing embodiments of the present invention are merely exemplary and are not to be construed as limiting the present invention. Many alternatives, modifications and variations will be apparent to those skilled in the art.

As described above, the modulation method according to the present invention shows better performance. The MTC DUSTM achieves smaller BER than the trellis coded DUSTM without increase of the computational complexity for the same spectral efficiency.

What is claimed is:

1. A method of differential unitary space-time modulation by encoding messages to transmit through $n_T$ transmit antennas in a communication system wherein the signals are transmitted between $n_T$ transmit antennas and $n_R$ receive antennas wherein $n_T$ is an integer no less than 2, and $n_R$ is an integer no less than 1, comprising the step of:

encoding a message into multiple trellis code which maximizes a product of minimum Euclidian distances between signals having minimum Hamming distance, wherein a relation among a transmitted signal C from a jth transmit antenna (j=1, 2, ..., $n_T$) at time t (t=1, 2, ..., T), the received signal Y at the ith receive antenna for the transmitted signal C, channel matrix H, and noise matrix N is given by Formula 2:

$$Y = \sqrt{\rho}CH + N \quad \text{[Formula 2]}$$

wherein, $Y = \{Y_t^i\}$ is the $n_{T \times n_T}$ received signal matrix, $C = \{C_{tj}\}$ is the $n_{T \times n_R}$ transmitted signal matrix, $H = \{h_j^i\}$ is the $n_T \times n_T$ channel matrix, $N = \{n_t^i\}$ is the $n_{T \times n_R}$ noise matrix, $\rho$ is the SNR of the receive antenna, and T is the symbolic period, wherein the symbolic period T is $n_T$; a unitarty space time constellation V for $V_k$, which is an $n_T \times n_T$ data matrix at the kth block among T symbolic period, is $$V \equiv \{V(l) \mid V(l) = V(l)^l, l = 0, 1, 2, \ldots, L-1\}$$

wherein, $$V(1) = \text{diag}\left(e^{j\frac{2\pi u_1}{L}}, e^{j\frac{2\pi u_2}{L}}, \ldots, e^{j\frac{2\pi u_{n_T}}{L}}\right), \text{ and}$$

L is the cardinality of V; and the $n_T \times n_T$ transmitted signal matrix $C_k$ at the kth block, and the received signal matrix $Y_k$ for the $C_k$ are given by Formulas 4 and 5, respectively:

$$C_k = V_k C_{k-1}, C_0 = I \quad \text{[Formula 4]}$$

$$Y_k = \sqrt{\rho}C_k H + N_k \text{ wherein,} \quad \text{[Formula 5]}$$

wherein, $N_k$ is the noise matrix at the kth block, and

H is the channel matrix which is constant during two consecutive blocks; and wherein pair-wise error probability (PEP) which is the probability of incorrectly decoding V to U when the encoded signal matrix sequence $V = \{V_0, V_1, \ldots\}$ is transmitted, is given by Formula 9, and in order to minimize the PEP of the Formula (9), the message is encoded to maximize the minimum block Hamming distance $\delta_{min}$ defined as Formula 14, and the minimum product of squared determinant distance $((IID^2)_{min})$ defined as Formula 10, wherein:

$$p(V \to U) \le \left(\frac{\rho}{8}\right)^{-n_T n_R \delta} \prod_{k \in \eta} |\det(V_k - U_k)|^{-2n_R} \quad \text{[Formula 9]}$$

$$\left(\prod D^2\right)_{min} \equiv \min_U \left(\prod_{k \in \eta(V,U)} D^2(V_k, U_k)\right) = \quad \text{[Formula 10]}$$

$$\min_U \left(\prod_{k \in \eta(V,U)} |\det(V_k - U_k)|^{\frac{2}{n_T}}\right)$$

$$\delta_{min} \equiv \min_U |\eta(V, U)| \quad \text{[Formula 14]}$$

wherein, $\delta$ is the size of $\eta(V,U)$ and represents the block Hamming distance between V and U, and $\eta(V,U)$ is the set of k such that $V_k \ne U_k$.

2. The method according to claim 1, wherein a partitioning process for encoding the message comprises steps of:

partitioning two-fold ordered Cartesian product of $A_0$, $A_0 \otimes A_0$ into L signal sets $A_0 \otimes B_i$ (i=0, 1, ..., L−1), wherein the jth element (j=0, 1, ..., L−1) of $B_i$ is nj⊕i, ⊕ is modulo L, and $A_0$ is the complete constellation (signal point 0, 1, 2, ..., L−1);

obtaining the jth 2-tuple signal points (j,nj⊕i) from the $A_0 \otimes B_i$ choosing n* which maximizes the minimum product of squared distance $(\Pi D^2)_{min}$ with $\delta_{min}$=m within the partitioned set using the Formula (11); and odd-even splitting the set partition and repeating the odd-even split:

$$n^* = \operatorname*{argmax}_{n} \prod D^2 = \operatorname*{arg\,max}_{n=1,3,\ldots,L/2-1} \left\{ \min_{m=1,2,\ldots,L/2-1} 16\sin\left(\frac{mu_1\pi}{L}\right) \sin\left(\frac{nmu_1\pi}{L}\right)\sin\left(\frac{mu_2\pi}{L}\right)\sin\left(\frac{nmu_2\pi}{L}\right) \right\}.$$

[Formula 11]

3. A method of differential unitary space-time modulation by encoding messages to transmit through $n_T$ transmit antennas in a communication system wherein the signals are transmitted between $n_T$ transmit antennas and $n_R$ receive antennas wherein $n_T$ is an integer no less than 2, and $n_R$ is an integer no less than 1, the method comprising the steps of:

(a) set-partitioning two-fold ordered Cartesian product of $A_0$, $A_0 \otimes A_0$ into L signal sets $A_0 \otimes B_i$ (i=0, 1, ..., L−1), wherein the jth element (j=0, 1, ..., L−1) of $B_i$ is nj⊕i, ⊕ is modulo L, $A_0$ is the complete constellation (signal point 0, 1, 2, ..., L−1), the jth 2-tuple signal points is (j,nj⊕i) of the $A_0 \otimes B_i$, and n is selected from n* which maximize the minimum product of squared distance $(\Pi D^2)_{min}$ with $\delta_{min}$=m within the partitioned set using the Formula (11);

(b) odd-even splitting the set partition and repeating the odd-even split to obtain a multiple trellis code in a $n_T \times n_T$ matrix;

(c) encoding messages by the multiple trellis code; and (d) modulating the encoded message by a unitary space-time modulation method according to Formula 2, wherein the relation among the transmitted signal C from the jth transmit antenna (j=1, 2, ..., $n_T$) at time t (t=1, 2, ..., T), the received signal Y at the ith receive antenna for the transmitted signal C, channel matrix H, and noise matrix N is given by Formula 2:

$$Y = \sqrt{\rho}CH + N \quad \text{[Formula 2]}$$

wherein,

Y={$Y_t^i$} is the $n_T \times n_T$ received signal matrix,
C={$C_{tj}$} is the $n_T \times n_R$ transmitted signal matrix,
H={$h_j^i$} is the $n_T \times n_T$ channel matrix,
N={$n_t^i$} is the $n_T \times n_R$ noise matrix,
ρ is the SNR of the receive antenna, and
T is the symbolic period, $$n^* = \operatorname*{argmax}_{n} \prod D^2 = \operatorname*{arg\,max}_{n=1,3,\ldots,L/2-1} \left\{ \min_{m=1,2,\ldots,L/2-1} 16\sin\left(\frac{mu_1\pi}{L}\right) \sin\left(\frac{nmu_1\pi}{L}\right)\sin\left(\frac{mu_2\pi}{L}\right)\sin\left(\frac{nmu_2\pi}{L}\right) \right\}.$$

[Formula 11]

* * * * *